(12) United States Patent
DeWall et al.

(10) Patent No.: US 7,097,148 B2
(45) Date of Patent: Aug. 29, 2006

(54) SCISSOR THRUST VALVE ACTUATOR

(75) Inventors: Kevin G. DeWall, Pocatello, ID (US);
John C Watkins, Idaho Falls, ID (US);
Michael E. Nitzel, Idaho Falls, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 181 days.

(21) Appl. No.: 10/896,579

(22) Filed: Jul. 21, 2004

(65) Prior Publication Data

US 2006/0017032 A1   Jan. 26, 2006

(51) Int. Cl.
*F16K 31/04* (2006.01)
*F16K 31/53* (2006.01)

(52) U.S. Cl. .............. 251/129.12; 251/249.5; 251/280; 137/554

(58) Field of Classification Search ........... 251/280, 251/249.5, 129.12, 129.11; 137/554, 556, 137/553
See application file for complete search history.

(56) References Cited

U.S. PATENT DOCUMENTS

| | | | |
|---|---|---|---|
| 535,614 A | 3/1895 | Corey, Jr. | |
| 566,452 A | 8/1896 | Foster | |
| 958,206 A | 5/1910 | Allen | |
| 1,477,641 A | 12/1923 | Francis | |
| 1,627,658 A | 5/1927 | Mauss | |
| 2,042,906 A | 6/1936 | McElwaine | |
| 2,344,594 A | 3/1944 | Bryant | |
| 2,354,987 A | 8/1944 | Fawkes | |
| 2,370,604 A | 2/1945 | Creene et al. | |
| 2,515,498 A | 7/1950 | Craene et al. | |
| 2,603,102 A | 7/1952 | Hobbs | |
| 4,029,289 A | 6/1977 | Miffre | |
| 4,206,900 A | 6/1980 | Willis | |
| 4,220,313 A * | 9/1980 | Petersen et al. | 251/280 |
| 4,265,141 A | 5/1981 | Bowman | |
| 6,079,442 A * | 6/2000 | Raymond et al. | 137/554 |
| 6,098,957 A * | 8/2000 | Vepy | 251/129.12 |
| 6,145,538 A * | 11/2000 | Park | 137/554 |
| 6,371,440 B1 * | 4/2002 | Genga et al. | 251/249.5 |

* cited by examiner

*Primary Examiner*—John Bastianelli
(74) *Attorney, Agent, or Firm*—Dahl Osterloth, LLP

(57) ABSTRACT

Apparatus for actuating a valve includes a support frame and at least one valve driving linkage arm, one end of which is rotatably connected to a valve stem of the valve and the other end of which is rotatably connected to a screw block. A motor connected to the frame is operatively connected to a motor driven shaft which is in threaded screw driving relationship with the screw block. The motor rotates the motor driven shaft which drives translational movement of the screw block which drives rotatable movement of the valve driving linkage arm which drives translational movement of the valve stem. The valve actuator may further include a sensory control element disposed in operative relationship with the valve stem, the sensory control element being adapted to provide control over the position of the valve stem by at least sensing the travel and/or position of the valve stem.

16 Claims, 5 Drawing Sheets

SCISSOR THRUST VALVE ACTUATOR

CONTRACTUAL ORIGIN OF THE INVENTION

This invention was made with United States Government support under Contract No. DE-AC07-99ID13727 awarded by the United States Department of Energy. The United States Government has certain rights in the invention.

TECHNICAL FIELD

This invention relates to valve actuator systems in general.

BACKGROUND

A commonly found safety-related component in government facilities, commercial nuclear power plants, and navy power plants is a motor operated or actuated valve. Such valves perform a wide range of safety related functions, from for example, containment isolation to controlling high-pressure coolant injection, as these are particularly well understood in the nuclear power area. Unfortunately, conventional valve actuator designs may often present operation and/or control problems.

In nuclear power plant situations, U.S. and international regulators have responded to such operational and control problems by requiring frequent and rigorous testing and adjustments for all of the motor-operated valves in nuclear power plants. Such testing is both time consuming and expensive.

Some of the problems of conventional motor-operated valves may be inherent in the respective designs thereof. For example, many conventional valves are highly torque dependent. The motors associated therewith output a high torque rotational motion. However, many of the actual valves are of a type having a rising valve stem which requires a substantially linear thrust load. For relatively small valves the currently available directly acting or geared actuators are often satisfactory. But, when high seating and unseating forces are required, as in the case of large diaphragm, gate and/or globe valves, the currently available actuators are often exceedingly complex with highly-specialized motors being required to give the high torques necessary to provide the desired valve movement forces to open and/or close the valve.

SUMMARY OF THE INVENTION

A valve actuator according to one embodiment of the present invention may comprise a frame disposed in a substantially stationary, operative relationship with a valve, and first and second linkage arms. A first end of the first linkage arm is operatively connected to the frame. A second end of the second linkage arm is operatively connected to a valve stem of the valve. A screw block is operatively connected to the first and second linkage arms so that the second end of the first linkage arm is operatively connected to the screw block and the first end of the second linkage arm is also operatively connected to the screw block. A motor drive system includes a motor driven shaft that is in operative threaded screw driving relationship with the screw block so that when the motor driven shaft is rotated by a motor of the motor drive system, the motor driven shaft drives translational movement of the screw block which in turn drives the movement of the first and second linkage arms which in turn drives translational movement of the valve stem. A sensory control element operatively associated with the motor drive system and the valve senses a position of the valve and operates the motor drive system in accordance with a sensed position of the valve.

BRIEF DESCRIPTION OF THE DRAWING

Illustrative and presently preferred exemplary embodiments of the present invention are illustrated in the drawing, in which.

DETAILED DESCRIPTION OF THE PREFERRED EMBODIMENTS

An exemplary valve actuator 10 according to the present invention will now be described with reference to the drawings. Starting with FIG. 1, an actuator 10 is shown which generally includes a mechanical drive mechanism 12 operably attached to a relatively stationary frame assembly 20. As will be described further, such a combination provides a valve actuator adapted to apply high, yet controlled mechanical forces with relatively low power input.

Figure 1:
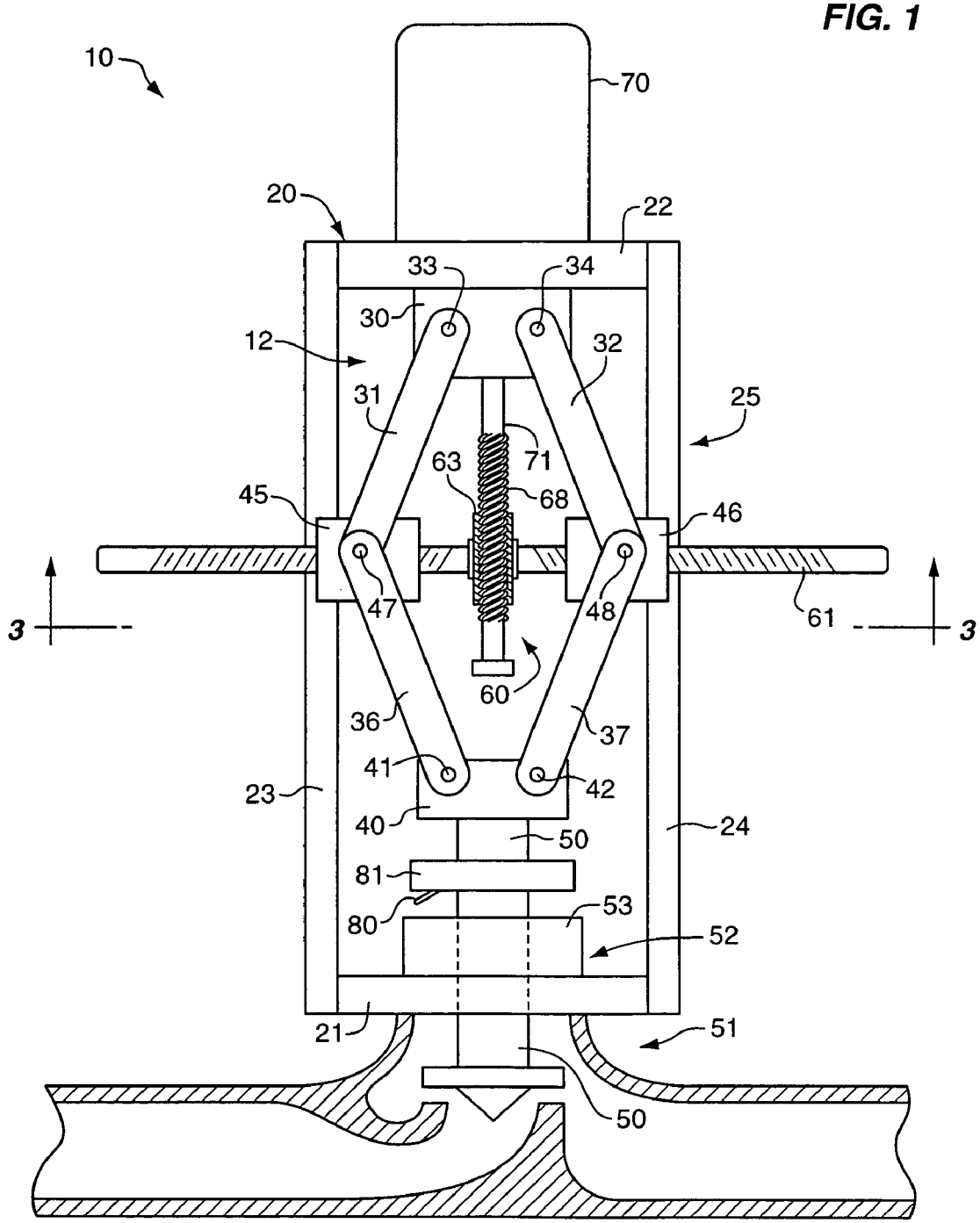
FIG. 1 is a frontal, partially cross-sectional elevation of an exemplary embodiment of a valve actuator as shown and described herein.

A frame assembly 20 of an actuator 10 may take many forms so long as it securely holds the other parts of the actuator 10 in proper operative, otherwise substantially movable relationship to a valve 51 to be actuated thereby. In some embodiments as shown in FIG. 1 for example, the frame 20 may be formed from and thus include a bottom mounting plate 21, top stationary or support plate 22, and elongated walls 23, 24 which may, in some embodiments, define a rectangular or a cylindrical enclosure identified generally by the reference numeral 25 in FIG. 1. If cylindrical, then this frame 20 may be similar to a large piece of pipe with two and/or elongated slots that may be defined lengthwise, i.e., running in the same direction as the cylindrical axis, one slot on each side of the cylinder 25 (note, in FIG. 1, the frame 20 is sectioned lengthwise along such slots to ease the view and description of the internally disposed drive mechanism 12).

The frame 20 is adapted to be connected to or adjacent the valve 51 in operative relation to the valve 51. In some embodiments, the frame 20 may be disposed on the valve 51. In such a situation, the bottom plate 21 of the frame 20 may either exist as a valve plate or a flange-like ring, or it may be attached to, a flange-like adapter ring that creates a cooperative configuration to that of the yoke assembly 52 of the valve 51. This allows the frame assembly 20 to be easily attached to the valve bonnet 53 without any requirement for modifying the valve 51. The top of the frame assembly 20 may in many embodiments be closed with the top plate 22 which may then provide what in some instances may be referred to as an upper reaction structure. Otherwise, top plate 22 provides a mounting location for the scissor drive mechanism 12, as well as serving as the mounting location for the motor 70. Note, the other frame members, e.g., wall members 23, 24 may alternatively provide this service, i.e., providing the mounting location for the drive mechanism 12 and/or the motor 70.

Figure 2:
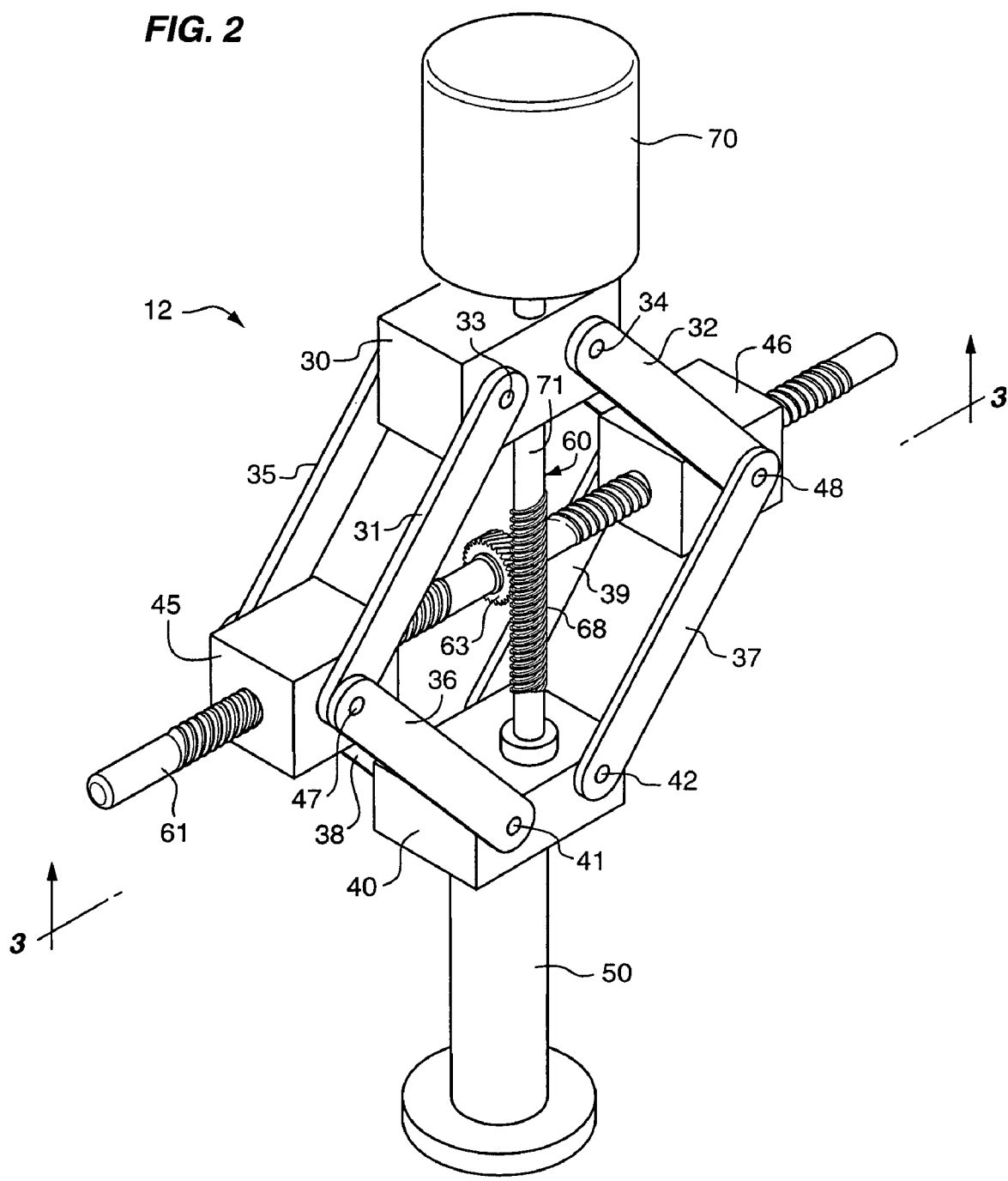
FIG. 2 is an isometric view of a drive portion or portions of an exemplary valve actuator like that shown in FIG. 1.

Referring now to the drive mechanism 12, please see FIGS. 1 and 2. The substantially stationary part of the drive mechanism 12 may be a frame support block 30 which may be attached as shown in FIG. I to some part of the frame assembly 20 as shown here, to top plate 22. Upper front, support linkage arms 31 and 32 are as shown in FIGS. 1 and 2, pivotally attached to support block 30 by pins 33 and 34. The back support linkage arms are similarly pivotally attached by pins which are not visible in the drawings (see e.g., arm 35 in FIG. 2). Note, the descriptive terms top and bottom, upper and lower, and front and back and the like are not intended to limit the orientation of the overall device or any part thereof in free space, but are rather included only to aid in the description of the embodiments as shown in the drawings. The lower front, valve linkage arms 36 and 37 are pivotally attached to a valve drive block 40 by similar pins, pins 41 and 42 in the front and arms 38 and 39 (FIG. 2) are similarly pivotally attached thereto by unseen pins in the back. The valve stem 50 of valve 51 (or as described below, a valve extension 50a (FIG. 5) of the actuator assembly 10) may then also be attached to the valve block 40.

Disposed substantially midway between blocks 30 and 40 are two screw blocks 45, 46. The lower end of the upper linkage arm 31 and upper end of lower linkage arm 36 are pivotally connected to screw block 45 by one or more pins, as shown here including at least a first pin 47. Here both arms 31 and 36 are pivotally connected to block 45 by the same single pin 47; however, an alternative might be to use a plurality of pins to make these pivotal connections to block 45. The corresponding back arms 35 and 38 (FIG. 2) may be similarly connected to block 45 by what would here be an unseen pin. Similarly, upper linkage arm 32 and lower linkage arm 37 may be pivotally attached to screw block 46 by a pin 48 as shown, or by a plurality of pins as described above. The other back side arms would be connected in similar manners following these descriptions. The linkage arms are thus connected in a position which provides for a mechanical "scissor"-like movement therebetween. In other words, the linkage arms are pivotally movable relative to each other and relative to the respective blocks to which they are operatively and pivotally connected.

Figure 3:
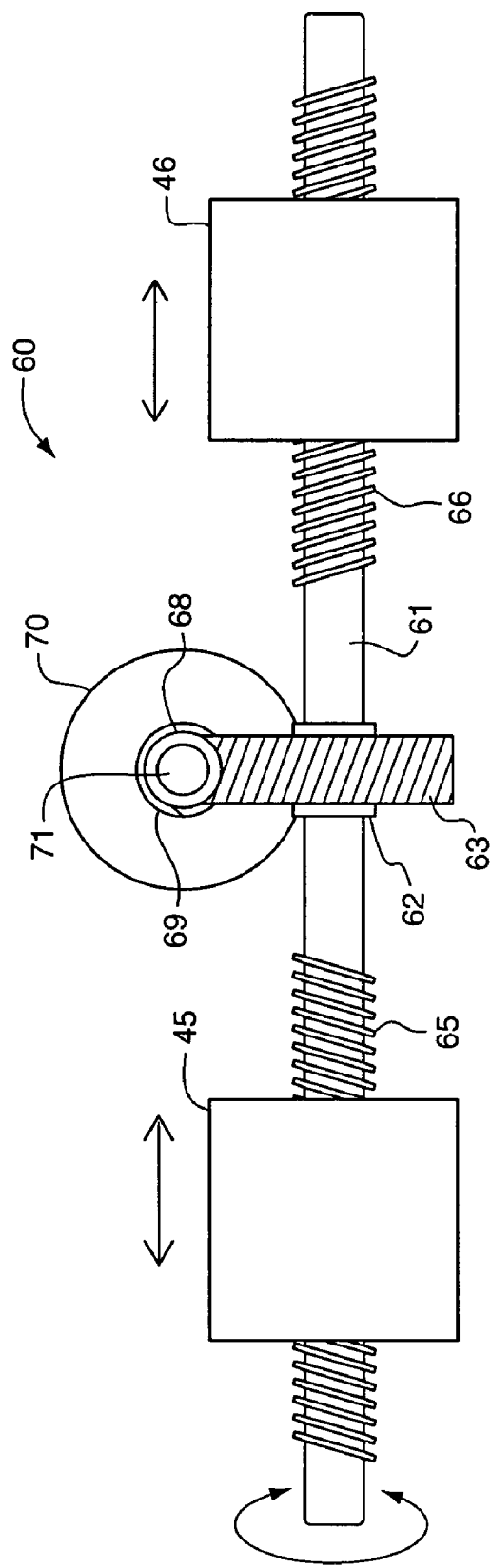
FIG. 3 is a schematic representation of an exemplary worm and worm gear combination which may be used in an actuator such as those shown in FIGS. 1 and 2, as could be viewed as along lines 3—3 thereof.

The mechanical scissor drive mechanism 12 (FIGS. 1 and 2) includes a screw drive system 60, exemplary details of which being shown in the schematic view of FIG. 3. Screw drive system 60 includes a screw shaft 61 having a screw hub 62 (FIG. 3) with an attached worm gear 63 correspondingly mounted on threaded screw shaft 61. Screw shaft 61 has two sets of oppositely threaded portions, e.g., first handed (e.g., left-hand) threads 65 on one side of hub 62 and second or opposite handed (e.g., right-hand) threads 66 on the other side of hub 62. Screw shaft 61 is threaded through pivotal screw blocks 45 and 46. To accommodate this, the two screw blocks 45, 46 have a threaded opening formed or defined through each block (one block has a left hand thread, the other block has a right hand thread) so that the blocks 45, 46 may then be disposed in operative relation with a screw drive shaft 61. The drive shaft threads 65, 66 on screw drive shaft 61 then match those in the corresponding screw block 45, 46 such that the rotation of the drive shaft 61 will drive movement of the screw blocks 45, 46 along the length of shaft 61. And, this movement of the two blocks 45,46 will consequently be in opposite directions, either further apart or closer together along the shaft 61.

As the drive shaft 61 is rotated and the screw blocks 45, 46 are moved, the linkage arms also pivotally move in a fashion which then causes the distance between the upper and the lower drive blocks 30, 40 to change, i.e., blocks 30 and 40 then move closer together or further apart, thereby shortening or lengthening the disposition of the total scissor drive mechanism 12 and thus respectively either pulling the stem 50 out of the valve 51 or pushing the stem 50 into the valve 51. These movements will be discussed further below.

As is also shown in FIG. 3, a worm 68 is engaged with the worm gear 63 of shaft 61. The worm 68 is also shown generally in FIGS. 1–5; and is further shown schematically in FIG. 3 having worm teeth 69. A main drive shaft 71 has the worm 68 disposed thereon and the drive shaft 71 is in turn, connected in rotatable or driven relationship with motor 70. Motor 70 could be electrical or otherwise (e.g., pneumatic or hydraulic) so long as it provides in the shown embodiment, a rotational drive to shaft 71. Then, the rotational relationships of the elements of FIG. 3 may be as follows; the motor 70 provides a rotation to shaft 71 and the shaft 71 thus turns the worm 68, which in turn, rotates the worm gear 63 which thereby turns the entire shaft 61 which thereby causes translational screw-driven movement of the corresponding blocks 45, 46. Alternatively, other drive arrangements are possible for coupling the motor 70 to the shaft 61, as would be obvious to persons having ordinary skill in the art after having become familiar with the teachings of the present invention. Consequently, the present invention should not be regarded as limited to the worm drive arrangement shown and described herein.

Figure 4:
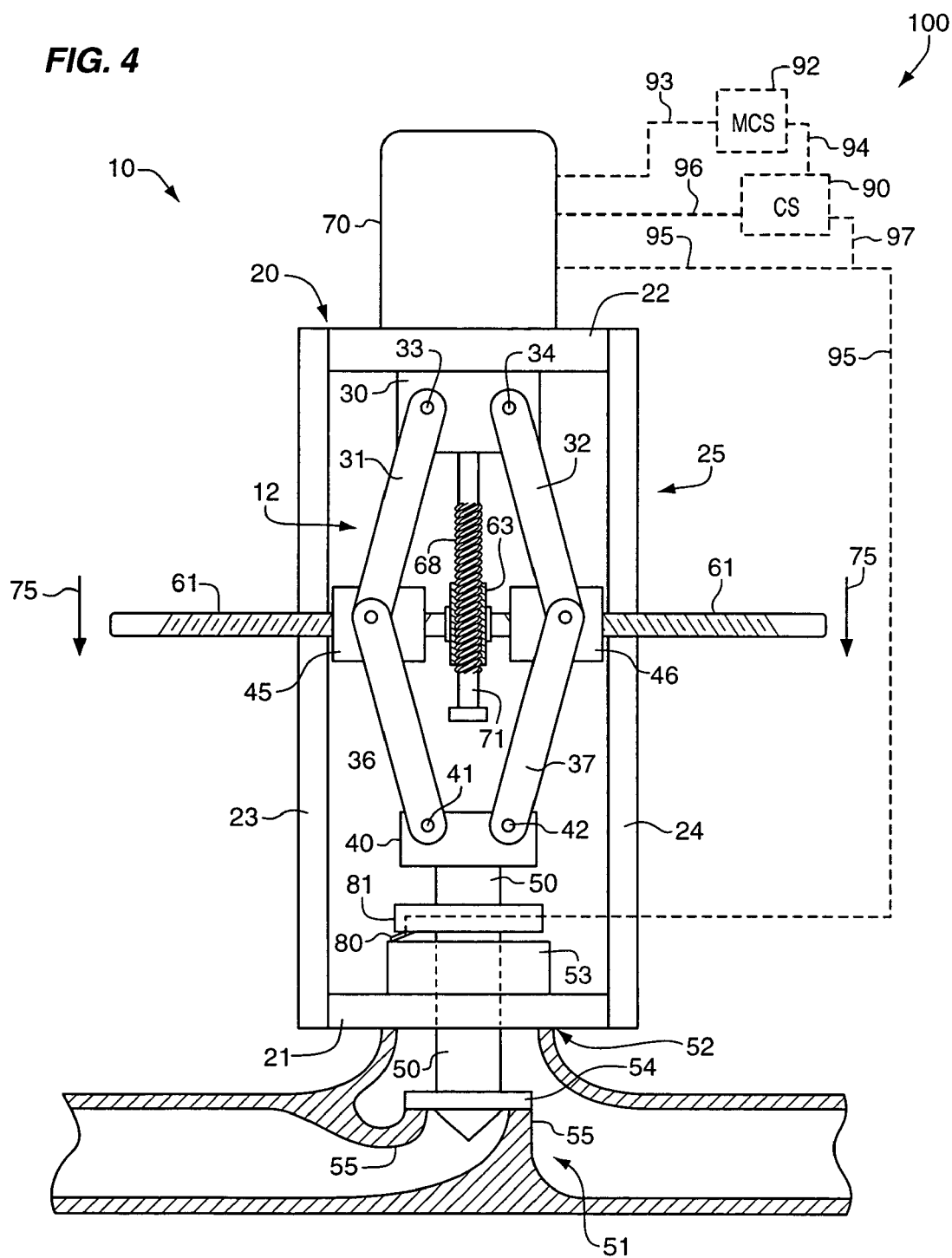
FIG. 4 is a frontal, partially cross-sectional elevation like that in FIG. 1 which rather shows an actuated valve in closed position; and, FIG. 5 is another frontal, partially cross-sectional elevation as in FIGS. 1 and 4 which rather shows an actuated valve in full open position.

FIG. 4 shows valve 51 in closed position with valve member 54 (also referred to as a flow restrictor or flow stoppage member 54) seated against the internal valve body or seat 55. Note, this FIG. 4 closed position is, as compared to the partially open position in FIG. 1, not only with the valve flow stoppage member 54 seated against seat 55, but with the screw blocks 45, 46 moved in, toward and disposed closely adjacent the worm 68. This positioning corresponds with a disposition of the linkage arms also squeezed closer together which ultimately has moved the valve drive block 40 downward and consequently also the valve stem 50 downward which in turn has forced the seating of the valve member 54. The threaded screw shaft 61 has also been moved downward slightly as well, see indicator arrows 75 in FIG. 4.

Figure 5:
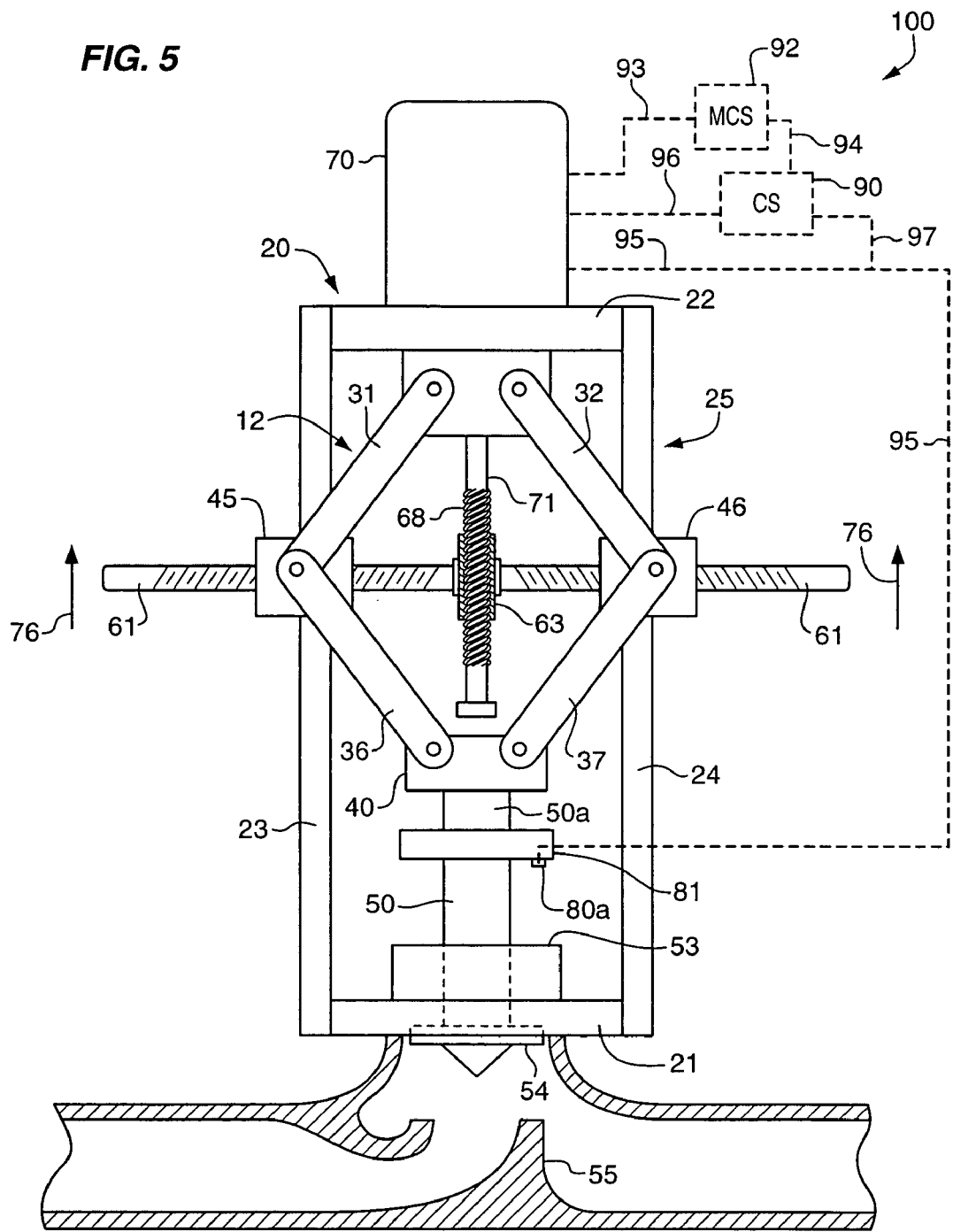

Then, in moving from the closed position shown in FIG. 4 to the open position shown in FIG. 5, the motor 70 is activated to turn the motor shaft 71. Then, rotation of the main drive shaft 71 rotates the worm 68 which turns the worm gear 63 which in turn, turns the screw shaft 61 which by rotating thereby imparts, by the respective, oppositely-handed threads 65,66, respective screw-driven forces to move the screw blocks 45, 46 translationally, and here laterally (note, as above, directional descriptors such as lateral or laterally are not intended to limit the orientation of the device(s) herein in operative space, but rather intended only to enhance the description). This lateral spreading of the screw blocks 45,46 away from the central area of the device, e.g., away from the worm 68 and worm gear 63, causes a spreading apart of the linkage arms (see e.g., arms 31, 32, 36, 37). As the linkage arms spread, block 40 is raised thereby substantially translationally or linearly lifting valve stem 50 and valve member 54 away from seat 55 and thereby opening the valve 51 as shown in FIG. 5. In this operation, the threaded shaft 61 has moved upward as well (see movement arrows 76).

A reverse operation can then also be performed by having the motor 70 turn the shaft 71 in the opposite direction causing opposite rotations of the worm 68 and the worm gear 63 and consequently also of the shaft 61. This opposite rotation causes the threads on shaft 61 to move the blocks 45, 46 in the reverse direction, here, inwardly, which then draws the linkage arms inwardly toward the worm 68 and worm gear 63 and thereby moves the valve drive block 40 and the valve stem 50 downward causing the movement and seating of the flow restrictor/stoppage member 54 against the internal valve body 55, see the closed position shown in FIG. 4. Note, numerous positions between fully open and fully closed may also be available, see for example the partially closed position shown in FIG. 1. Such an intermediate position may provide a desirable flow control function such as a reduced or a throttled flow.

Note, though the embodiments shown in FIGS. 1, 4 and 5 depict usage with what may often be referred to as a globe valve with a disc or flanged plug member as the flow stoppage member 54; other sorts of valves and consequent flow restrictor or stoppage members are readily usable herewith as well. Generally, the valve might preferably be capable of accepting a translationally/linearly forced stem movement, or otherwise be adapted to convert such an actuator movement to the sort of movement necessary to move its respective flow restrictor member 54 into alternate seated/closed or unseated/open position. Gate, knife, ball, needle, disc and/or butterfly valves, inter alia, may be useful herewith as well.

A valve actuator 10 as shown and described may also be referred to as a scissor thrust actuator due to the scissor-like action of the linkage arms in receiving and transferring the valve opening and closing thrust forces along the linkage arms via the various blocks to which those arms are pivotally attached. Actuator 10 may be understood as primarily a mechanical device to open, close, and/or reposition a valve, but it may also be considered an electromechanical device in many embodiments because in many such embodiments, the initial power from or perhaps control over motor 70 may be electrical in nature, e.g., the motor 70 may be an electrical motor 70 to turn shaft 71 which then effects all of the other mechanical motions described herein.

Actuators 10 as described here are in many embodiments alternatively controllable from a remote location. In other words, remote control can be had by any means which provides for switching the motor 70 on to rotate, in either direction to alternately open or close or otherwise reposition, e.g., intermediately, the valve 51. See also for example FIGS. 4 and 5 where an alternative/optional control system (CS) 90 and/or an alternative/optional motor control signal/signaler (MCS) 92 are shown in dashed lines, as are their connections to the motor 70. Either or both of these elements could be used in or as part of the control of the operation of the motor 70. And, these could be incorporated in a motor 70 or could be used externally from a remote location as indicated by the optional connection lines (dashed) running from each of the CS 90 and MCS 92 to the motor 70. More particularly, the connections 93 and 94 emanating from the MCS 92 respectively depict alternative connections of the MCS 92 respectively to the motor 70 and/or the CS 90. Similarly, the connections 95, 96 and/or 97 respectively illustrate alternative connections of the sensory control element 80 (see description below) to the motor 70 (connection 95), and/or of the CS 90 to the motor 70 (connection 96) or of the sensor 80 to the CS 90 (branch connection 97; note though shown as a branch, it need not be as it may be its own separate connection direct from the sensor to the CS). Note, any or all of these connections could be hardwired or they could either or both be wireless connections. Note also the optional alternative connection 94 of the MCS 92 to the CS 90 which indicates that a remote control signal could be communicated from the MCS 92 to and/or through the CS 90 to control the motor 70. The CS 90 and/or the MCS 92 are each optional devices which may thus exist and/or operate together or independently or may indeed not be included at all, e.g. where the sensor 80 communicates directly via line 95 with the motor without the CS or MCS. Even so, either or both separately or together may be considered as a motor control system or as parts of a motor control system, such a motor control system being designated generally by the reference numeral 100 in FIGS. 4 and 5. As above, such a motor control system 100 with either of both of a CS 90 and/or an MCS 92 may alternatively be internal to the motor 70. Any of these control elements may be included, though not shown, in any of the embodiments hereof.

Moreover, as introduced above, one or more sensory control elements or switches, such as switch 80 schematically shown in FIG. 1, and/or one or more sensors such as sensor 80a schematically shown in FIG. 5, may be used herein as a part of an electromechanical device 10. Such sensory control elements may thus also be parts of or act substantially solely as a motor control system. More particularly, a switch 80 and/or sensor 80a (hereafter collectively, and/or interchangeably referred to as a switch/sensor 80, or sensory control element or device or the like) may in an exemplary embodiment, be positioned and adjusted so that the movement of the lower valve thrust block 40, and/or the corresponding valve stem 50, may be sensed, controlled and/or limited in either or both the open and closed directions. The control switch(es)/sensor(s) 80 may then be able to stop movement of the valve member 54 (as by shutting off the power to the motor 70) if/when a desired or otherwise designated travel limit or point of travel is reached. In this way then, even if a sort of switch is selected for use here is not technically considered a sensor, it may act as a sensory control element in the current context in its acting as an indicator or actually be actuated upon the sufficiently changed condition of the desired travel limit of the particular element has been reached as would be indicated by contact of that element with the actuating portion of the switch sufficient to activate the switch to provide a control signal or otherwise control or open or close a control circuit.

Such switches/sensors or sensory control elements 80 may be as shown, connected to a support member 81 (see FIG. 1). Such a support member 81 is an optional member and may be disposed on valve stem 50 (see FIG. 1) or on an extension stem member 50a (see FIG. 5) (if used, an optional extension member 50a may be a part of the actuator assembly 10 itself as opposed to being a pre-existing stem 50 of a previously constructed valve 51 and as such, member 50a and/or support member 81 may be the part or parts directly connectable to the stem 50, as opposed to the block 40 being the member directly connectable thereto as described/suggested above). In either case, the support member 81 or an equivalent structure or electronic device, may be adjustable to provide for proper/desirable positioning of the sensor/switch 80. As such, member 81 may be made separately movable and securable at various locations longitudinally along the stem (or stem extension 50a) to a desired height to provide for proper/desired seating of the valve member 54 in seat 55 of valve 51.

A control switch 80 might be a micro-switch which might be contact and/or deformably activated by sufficient/desirable contact thereof with the valve bonnet 53, for example (see e.g., the contrasting positions of FIGS. 1 and 4). In such an instance, a micro-switch can be said to have at least sensed the position or location of the valve stem, even if it may have gone further and actually communicated a switching off of the whole of or a part of the electrical system, as for example, a switching off of the motor. Even so, position detection and/or sensing is not necessary for operation hereof. Other sensors and/or switches are also usable as sensory control elements herein in addition to or in lieu of a micro switch, including for example but not by way of limitation, optical, acoustic, force, pressure and/or velocity sensors which could be activated to switch on and/or off the motor 70. The sensory control element 80a (see FIG. 5) is intended to suggest in one embodiment, an optical (or acoustic, or like) position sensor, which could thus determine by, for example reflected electromagnetic waves, inter alia, the relative position of the support member 81 relative to the valve bonnet 53 and by then communicating that information directly to the motor 70 or to an appropriate control system, see e.g. CS 90, which may then control the actuator 10, by e.g., stopping (or starting) movement of the actuator 10, by e.g., stopping (or starting) the motor 70. Note, the dashed connection lines in FIGS. 4 and 5 indicate the optional alternative connections of a sensory control element 80 or 80a either directly to a motor 70 or to a CS 90 such that either of these then communicates the ultimate control signals to and as used by the motor 70. Use of either term switch or sensor or sensory control element is herein intended to include the others and any of these or other alternative sensors or switches and either of these may be relatively directly connected in operative controlling relationship with the motor 70 and/or with a control system such as system 90 and/or 100.

Alternatively, and/or additionally, such sensory control elements might be placed elsewhere in or operatively near or adjacent the device 10, and/or in plurality fashion on or adjacent many of the movable parts of the actuator assembly 10. As another example, the pins 41, 42 that connect the drive linkage legs or arms to the lower thrust block 40 could have sensors disposed therein or thereon, or could otherwise be internally gauged and/or calibrated to provide a continuous indication of valve stem thrust while the scissor thrust actuator 10 is operating. In addition and/or as an alternative, either the lower thrust block 40 or the valve stem 50 can be instrumented (e.g., optically or acoustically) to provide a continuous indication of valve stem position. Such thrust and/or position sensors may thus allow for a valve 51 to be remotely controlled with precision while simultaneously allowing local and/or remote diagnostic testing of the valve actuator assembly 10.

Various positions of the valve member 54 may also be made available by an actuator such as those described herein, as opposed to merely fully-closed or fully-opened positions (as shown in respective FIGS. 4 and 5). For example, one or more partially-closed, flow-restricted lower flow rate positions might also be provided, as can be an interpretation of the position of FIG. 1. Control elements, switches and/or sensors of many types may be used to provide a desirable position of the valve member 54 and thus control flow through the valve 51. For example, one or more indications may be placed or formed on the stem 50 or on a stem extension 50a to indicate one or more pre-selected positions for the valve stem 50 and thus of the valve member 54 relative to the seat 55. These or other indicators, e.g., may be on the shaft 61 or in or on the frame assembly 20 relative to the screw blocks 45, 46 and/or thrust block 40, and/or may be used in conjunction with or may be sensors or switches 80 or the like which may provide for halting motion of the stem 50 at any one or more desired locations thereby providing flow control through the valve 51.

Now follows a description of a general operation with controls. After installation of an actuator 10 on a valve 51 in the position shown, e.g. FIGS. 4 and 5, starting for just one example when the valve is in a fully open position (see FIG. 5), a control signal is sent to the motor 70 directing the motor to turn to close the valve 51 or otherwise restrict flow (as by closing incompletely). Such a signal may come directly from an MCS 92 via a connection 93 (hardwired or wireless), or may come from the MCS 92 via the CS 90 via connections 94 and 96 or may come from the CS 90 directly via connection 96. In other examples, perhaps a manual switch may be made available on or adjacent the motor 70 without the CS or MCS. Either way, the motor 70 then directs the closing operation until the valve member 54 abuts or reaches the desired position adjacent the seat 55. Note, the stopping of the motor 70 when the valve member reaches the desired position may also be externally or remotely controlled via the MCS 92 and/or the CS 90 or as may be preferred the sensor 80 or 80a may be used to communicate via line 95 that the stopping position has been reached so that the motor 70 can stop turning. The sensor communication may be direct to the motor 70 via line 95 or may be directed first through the CS 90 via line 97 or the like, then to motor 70 via line 96. The CS 90 may be used to interpret and/or convert the signal from the sensor or the MCS into an appropriate signal for the motor 70. Then, when desired, an opposite, opening signal can be sent to the motor 70. This opening signal can similarly be sent directly from the MCS 92 via a connection 93, or may be sent from the MCS 92 via the CS 90 via connections 94 and 96 or may be sent by the CS 90 directly via connection 96. As before, in other examples, an optional manual switch may be made available on or adjacent the motor 70 without the CS or MCS for this purpose. Either way, and also as in the closing operation, the motor 70 can then directs the opening operation until the valve member 54 abuts or reaches the desired position adjacent the yoke 52 and/or bonnet 53. Note here also, the stopping of the motor 70 when the valve member reaches the desired position may also be externally or remotely controlled via the MCS 92 and/or the CS 90 or as may be preferred the sensor 80 or 80a or a similar sort of sensor may be used to communicate via line 95 that the stopping position has been reached so that the motor 70 can stop turning. Alternatives to the sensor(s) 80, 80a may be that the motor has a timer or other programming mechanism which can provide a limit on the extent of movement of the motor, e.g. a revolution counter, or some other sort of sensor internal to the system, inter alia. Calibrations and/or stops of various types may also or alternatively be desired for motor control.

The actuator designs herein described are intended to produce thrust instead of torque for translational movement of the valve stem. They may thus also control the respective valve based on the position of the stem. The drive train assembly uses the mechanical advantage offered by the scissor mechanism. A scissor mechanism may produce a large stem thrust for those situations in which maximum valve-opening and/or valve-closing thrusts are required. In addition, the scissor mechanism minimizes the power demands on the motor while delivering maximum thrust. In some embodiments, the resulting thrust may be either or both a conversion of rotational force to translational and/or an amplification of the initial rotational drive force through use of the "scissor" linkages or levers. As introduced above, sensors may be available to measure and output with precision the parameters needed to understand and verify the operation and health of the unit. The uncertainties due to the mismatch between the thrust requirements of a valve and the torque capabilities of an actuator may thus be eliminated.

The output capabilities of these actuators may be made to match the thrust demands of the respective valves to which they will be connected, resulting in a reduction in the torque required from the electric motor as well as a reduction in the power consumption of the overall valve operation/actuation device. Actuators such as those described here may also include features which greatly reduce the operation and maintenance costs associated with conventional actuators while simultaneously providing critical valve and actuator operating parameters for real-time or post-actuation valve control and diagnostics.

The present actuators 10 are also straightforwardly manufacturable, not generally requiring special castings and/or machining as is a common issue inherent in many existing actuator designs. This makes the embodiments described herein economical to manufacture, assemble and/or install. In addition, the setup and/or control of the unit may be simple and yet relatively precise. These features would reduce if not eliminate much of the heavy engineering burden currently being carried by many valve-control industries for operations and/or maintenance of existing motor-operated valves.

The embodiments hereof could also be retrofitted into/onto valves used in many industries, providing benefits to the nuclear power industry as introduced above as well as to other industries, such as chemical, non-nuclear power, and the petroleum industries. The inherent ability of the embodiments hereof to output thrust and/or positioning and like parameters with precision control make these actuators ideal for remote valve applications, such as offshore oil drilling. These designs have additional advantages for navy applications, for in addition to the operational and maintenance advantages, the embodiments hereof are quiet, an important feature for navy submarine applications.

Another benefit of the above-described actuators is reliability. A large number of motor-operated valves found in today's nuclear power plants have very important safety functions, such as pipe break flow isolation or emergency coolant injection. The embodiments hereof reduce if not eliminate many of the uncertainties associated with existing motor-operated valves and may thus greatly improve the reliability of these devices. Therefore, the commercial nuclear industry, inter alia, would benefit directly by eliminating economic, regulatory, and/or safety problems inherent in many existing actuator units.

Various alternative embodiments are available, and many of these may fall in the general category of alternative structures otherwise integrally formed or eliminated. In a first such case, the motor 70 and thus any members depending therefrom might be directly (or indirectly) be connected to an optional alternative support surface apart from the valve 51. In such a case then, the support frame 20 and/or any one or more of the frame members 21, 22, 23 and/or 24 may not be necessary or otherwise simply eliminated. Then, the support block 30 could be connected to the motor 70 or to the support surface to which the motor 70 is also connected. The alternative support surface could thus be a frame or simply an alternative thereto.

Similarly, in this case, or in a case like that shown in FIGS. 1, 2, 4 and 5 the first or top ends of the upper linkage arms (represented by arms 31 and 32 in FIGS. 1, 2, 4 and 5, e.g.) may be connected directly to the motor 70 (or to the alternative surface to which such motor might be alternatively connected), or directly to the frame 20 either at plate 20 or more directly to members 23, 24, in which cases either or both of the support block 30 and/or top plate 22 may not necessarily exist. In any of these cases, however, the upper part(s) of the upper arm(s) would still be connected to a substantially stationary (at least relative to the valve) support portion either of the frame, or of the motor, or the optional alternative support surface to which such motor might be attached. Similarly, the drive block 40 could be eliminated if the bottoms of the lower linkage arms (e.g. arms 36, 37) could be adapted to be directly connected to the valve stem 50. In either case (e.g., with or without the block 40), the lower arms could be said to be operatively connected to the stem.

Further alternatives in this vein are also available; e.g., in the number of linkage arms used. In one such case, perhaps a single upper linkage arm (e.g., arm 31) could be connected to an upper support portion, and a singular lower linkage arm (e.g., arm 36) could then depend from a screw block 45 and then be operatively connected to the stem. Then any reasonable number of further arms could be added, upper and/or lower. Indeed, it is further possible to hold the lateral threaded drive shaft 61 so that it has no translational movement (see e.g., arrows 75 and 76 in FIGS. 4 and 5), and then only a single (e.g., only an arm 36 or 37) (or any reasonable number of additional) lower linkage arms would be necessary to effect the movements described herein.

Still further, it is possible to mount the motor 70 in a lateral relation to the frame 20 such that the motor 70 directly drives, i.e., rotates the threaded drive shaft 61 thereby eliminating the worm 68, worm gear 63 and the other drive shaft 71. The drive train 60 could thus be reduced to the motor 70 and the threaded drive shaft 61.

Having herein set forth exemplary embodiments of the present invention, it is anticipated that suitable modifications can be made thereto which will nonetheless remain within the scope of the present invention. Therefore, it is intended that the appended claims be construed to include alternative embodiments of the invention except insofar as limited by the prior art.

The invention claimed is:

1. A valve actuator adapted to be disposed in operative relationship with a valve having a valve stem, the valve actuator comprising:
   a frame disposed in a substantially stationary, operative relationship with the valve, said frame having a first end and a second end, said frame defining a longitudinal axis extending parallel to a line between the first end and the second end, and the first end of the frame in attachment to the valve;
   first and second linkage arms each having first and second ends, the first end of said first linkage arm being operatively connected to the second end of said frame; the second end of said second linkage arm being operatively connected to the valve stem of said valve;
   a screw block, said screw block being operatively connected to said first and second linkage arms such that the second end of the first linkage arm is operatively connected to the screw block and the first end of the second linkage arm is also operatively connected to the screw block;

a motor drive system, comprising:
  a motor connected to the second end of said frame and having a motor shaft, said motor shaft having a worm thereon; and
  a motor driven shaft operatively connected to said motor, said motor driven shaft being generally perpendicular to the longitudinal axis defined by the frame, said motor driven shaft also being generally perpendicular to the motor shaft, a worm gear mounted on the motor driven shaft, said worm gear engaging said worm of said motor shaft, said motor driven shaft being threaded and being disposed in operative threaded screw driving relationship with said screw block, so that when said motor driven shaft is rotated by said motor shaft, said motor driven shaft drives translational movement of said screw block which in turn drives the movement of the first and second linkage arms which in turn drives translational movement of the valve stem; and a sensory control element operatively associated with said motor drive system and said valve, said sensory control element sensing a position of said valve and operating said motor drive system in accordance with a sensed position of said valve.

2. A valve actuator according to claim 1, wherein said sensory control element is adapted to provide control in a manner selected from the group consisting of: controlling the movement of said valve stem by at least providing a control signal when said valve stem has reached a designated amount of travel; and, controlling the position of said valve stem by at least sensing a position of said valve stem.

3. A valve actuator according to claim 1, wherein said first linkage arm is a first support linkage arm, and said second linkage arm is a first valve linkage arm, said valve actuator further comprising: a second support linkage arm and a second valve linkage arm each having first and second ends, the first end of said second support linkage arm being operatively connected to said frame, the second end of the second support linkage arm being operatively connected to said screw block, the first end of said second valve linkage arm being operatively connected to said screw block and the second end of said second valve linkage arm being operatively connected to said valve stem of said valve.

4. A valve actuator according to claim 1 wherein said screw block is a first screw block, said valve actuator further comprising: a second screw block, and third and fourth linkage arms, wherein said third and fourth linkage arms each have first and second ends, the first end of said third linkage arm being operatively connected to said frame; the second end of said fourth linkage arm being operatively connected to said valve stem of said valve; and wherein said second screw block is adapted to be connected to said third and fourth linkage arms such that the second end of said third linkage arm is operatively connected to said second screw block and the first end of said fourth linkage arm is also operatively connected to said second screw block; and wherein said motor driven shaft is disposed in operative threaded screw driving relationship with said second screw block such that when said motor is operated to rotate said motor driven shaft, said motor driven shaft in turn drives translational movement of said second screw block which in turn drives rotatable movement of said third and fourth linkage arms which in turn drives translational movement of said valve stem.

5. A valve actuator according to claim 4 wherein said first and third linkage arms are first and second support linkage arms, and said second and fourth linkage arms are first and second valve linkage arms, said valve actuator further comprising: third and fourth support linkage arms each having first and second ends, the first ends of said third and fourth support linkage arms being operatively connected to said frame, the second ends of the third and fourth support linkage arms being respectively operatively connected to said first and second screw blocks; the first ends of said third and fourth valve linkage arms being respectively operatively connected to said first and second screw blocks and the second ends of said third and fourth valve linkage arms being operatively connected to said valve stem of said valve.

6. A valve actuator according to claim 4 wherein said motor driven shaft has two oppositely threaded portions, one each in operative engagement with each of the respective said first and second screw blocks.

7. A valve actuator according to claim 1 in which the operative connection of said motor to said motor driven shaft includes a worm rotatably connected to said motor and a worm gear connected to said motor driven shaft, said worm gear being engaged with said worm.

8. A valve actuator according to claim 1 wherein said frame is fixedly mounted to said valve.

9. A valve actuator according to claim 1 wherein the operative connection of the second end of said second linkage arm to said valve stem comprises a valve block.

10. A valve actuator according to claim 1 wherein said frame further comprises a support portion, the support portion of said frame having a further characteristic selected from the group consisting of: the support portion of said frame is a support block attached to said frame and the support portion of said frame includes a support plate to which said motor is mounted.

11. A valve actuator according to claim 1 wherein said frame comprises a substantially cylindrical member.

12. A valve actuator according to claim 1 wherein said sensory control element is selected from the group consisting of: switches, microswitches, position sensors, optical sensors, acoustic sensors, force sensors, pressure sensors and velocity sensors.

13. A valve actuator according to claim 1 wherein said sensory control element is adapted to provide control of said motor by being adapted to switch said motor alternately on and off.

14. A valve actuator adapted to be disposed in operative relationship with a valve having a valve stem, said valve actuator comprising:
  a frame disposed in a substantially stationary, yet operative relationship with said valve, said frame having a first end and a second end, said frame defining a longitudinal axis extending parallel to a line between the first end and the second end, and the first end of the frame in attachment to the valve, and said frame having a support portion at the second end thereof;
  at least one valve driving linkage arm having a first and a second end; the first end of said first linkage arm being operatively connected to the second end of said frame; the second end of said at least one valve driving linkage arm being operatively connected to said valve stem of said valve;
  a screw block operatively connected to said at least one valve driving linkage arm so that the first end of said at least one valve driving linkage arm is pivotally connected to said screw block; and
  a motor drive system comprising:

a motor connected to the support portion of said frame and having a motor shaft, said motor shaft having a worm thereon; and a motor driven shaft being operatively connected to the motor, said motor driven shaft disposed in a direction generally perpendicular to the longitudinal axis defined by the frame, said motor driven shaft also being disposed in a direction generally perpendicular to the motor shaft, a worm gear mounted on the motor driven shaft, said worm gear engaging said worm of the motor shaft, said motor driven shaft being threaded and disposed in operative threaded screw driving relationship with said screw block, said motor shaft rotating said motor driven shaft which when so rotated, in turn drives translational movement of said screw block which in turn drives rotatable movement of said at least one valve driving linkage arm which in turn drives translational movement of said valve stem.

15. A valve actuator according to claim 14 further comprising a sensory control element disposed in operative relationship with said valve stem, said sensory control element providing control over a position of said valve stem by at least sensing the position of said valve stem.

16. A valve actuator according to claim 15 wherein said sensory control element is an element selected from the group consisting of: switches, microswitches, position sensors, optical sensors, acoustic sensors, force sensors, pressure sensors and velocity sensors.

* * * * *